United States Patent [19]

Troy et al.

[11] Patent Number: 4,689,742
[45] Date of Patent: Aug. 25, 1987

[54] AUTOMATIC LOTTERY SYSTEM

[76] Inventors: Seymour Troy, 2190 74 Ave., Sunrise, Fla. 33310; Kenneth E. Mullenix, 7117 SW. Archer Rd., Gainesville, Fla. 32601

[21] Appl. No.: 861,612

[22] Filed: May 5, 1986

Related U.S. Application Data

[63] Continuation of Ser. No. 778,286, Sep. 20, 1985, abandoned, which is a continuation of Ser. No. 465,100, Feb. 9, 1983, abandoned, and a continuation-in-part of Ser. No. 215,150, Dec. 12, 1980, Pat. No. 4,494,197.

[51] Int. Cl.$^4$ ............................................. G06F 15/28
[52] U.S. Cl. ............................... 364/412; 273/138 A
[58] Field of Search ............................... 364/411, 412; 273/138 A, 138 R

[56] References Cited

U.S. PATENT DOCUMENTS

| | | | |
|---|---|---|---|
| 3,810,627 | 5/1974 | Levy | 273/138 A |
| 3,852,576 | 12/1974 | Rudd | 273/138 A |
| 4,157,829 | 6/1979 | Goldman et al. | 273/138 A |
| 4,206,920 | 6/1980 | Weatherford et al. | 273/138 A |
| 4,213,524 | 7/1980 | Miyashita et al. | 273/138 A |
| 4,339,798 | 7/1982 | Hedges et al. | 364/412 |
| 4,494,197 | 1/1985 | Troy | 364/412 |

*Primary Examiner*—Jerry Smith
*Assistant Examiner*—Allen MacDonald
*Attorney, Agent, or Firm*—Kane, Dalsimer, Kane, Sullivan & Kurucz

[57] ABSTRACT

A wagering system having a central processor and a plurality of playing consoles remote therefrom with said console capable of providing data inputs to the central processor, with such data inputs including identification of the playing console, the player, amount played, and games selected which may be an instantaneous game or a delayed game with the player console having a means capable of providing a winning check or printed record of the play to the player along with being able to verify a win or a loss upon the determination of a winning play.

8 Claims, 10 Drawing Figures

PLAYER CONSOLE

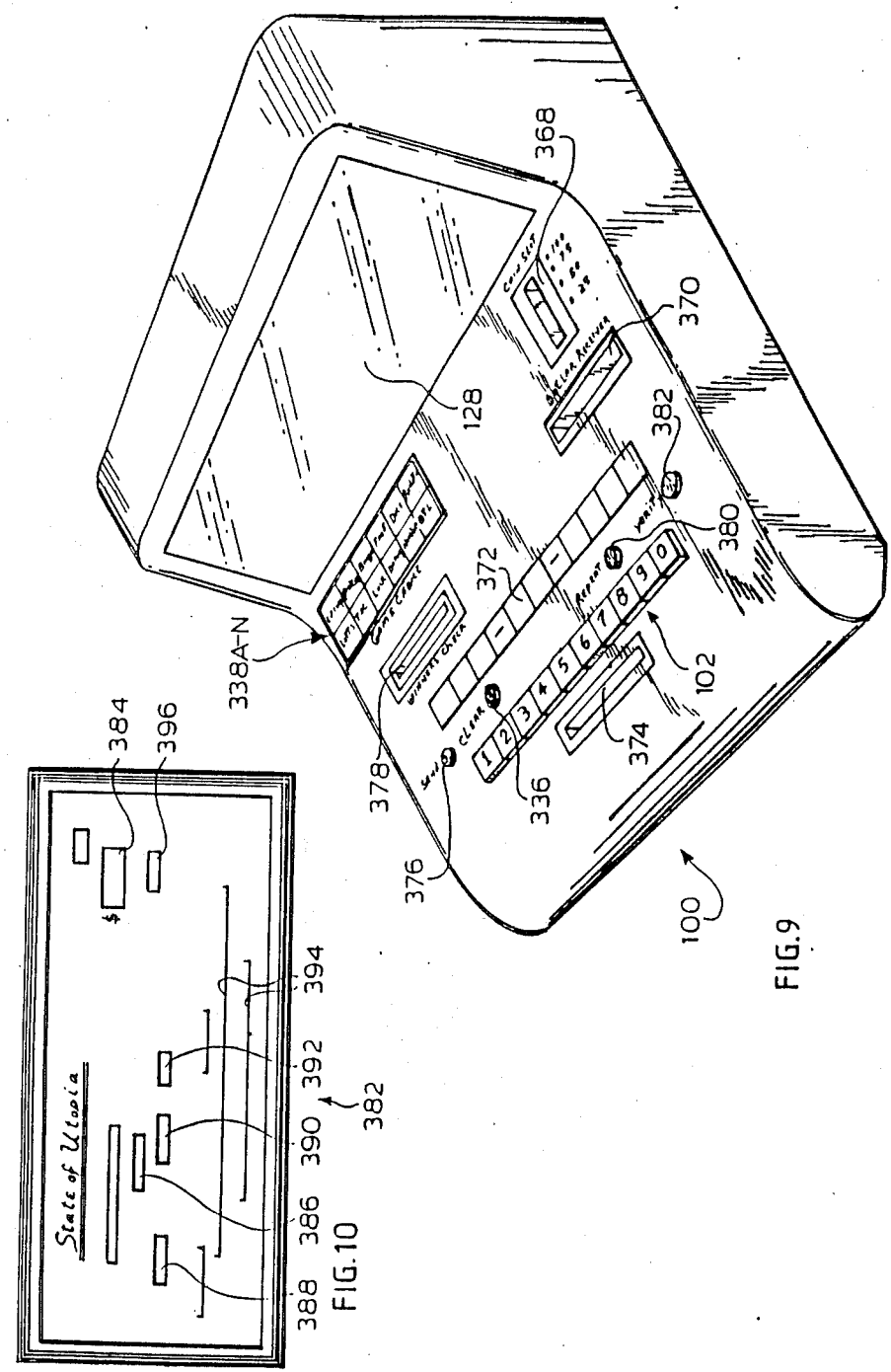

AUTOMATIC LOTTERY SYSTEM

CROSS REFERENCE TO RELATED APPLICATION

This a continuation of co-pending application Ser. No. 778,286 filed on Sept. 20, 1985 now abandoned which is a continuation of co-pending application Ser. No. 465,100 filed on Feb. 9, 1983 now abandoned, and a continuation-in-part of U.S. patent application Ser. No. 215,150 filed Dec. 12, 1980, now U.S. Pat. No. 4,494,197 issued Jan. 15, 1985 the disclosure of which is incorporated herein by reference.

BACKGROUND OF THE INVENTION

1. Field of the Invention

This invention relates to an automatic lottery system.

2. Description of the Prior Art

Many states in this country have adopted some type of public lottery system for the purpose of supplementing their revenue. The lottery system has become an accepted alternative to increased taxes and participants are willing to invest in a chance for greater gain.

While the lottery may have a psychological advantage over taxes, it must also be economically practical. Existing lotteries usually involve the purchasing of a numbered ticket with a subsequent drawing determining the winner. Another type lottery called "Instant Lottery" requires the scratching of a filmed ticket surface to determine an instant win. However, lotteries of this type are based upon the premise that a certain number of tickets are going to win of all the tickets produced. This means of determining odds might only be effective if all of the tickets produced are sold and winning and losing tickets are distributed evenly throughout the system.

This however, is not the case. The authorities running the system can never be sure how many tickets will be sold or whether winning tickets are proportionately distributed with losers. Because of this, the player can never be sure exactly what his chances are. Printed tickets are capable of being forged, stolen, lost or even misprinted, which recently occurred on a grant scale in New York State, all of which reveals the fraility of such systems, and ultimately results in player discontent.

Also, the overall administration of such a system is extremely expensive and ever increasing with the cost of services and governmental operation always on the rise. Considerable overhead is alone present in the printing and distribution of the tickets. In order to maintain the lottery as a viable source of revenue, a change from the present form is necessary.

In addition, conventional wagering machines are generally localized thus limiting their access by the public. If a wagering machine is located so as to be outside of a controlled (security guard environment) area in situations where wins are paid in cash money from the wagering machine, the wins and winner are subject to foul play by either witnesses to the win at the scene, or subsequently when they depart. The larger the win the greater the criminal attraction. Even at the very scene of the win a winner may be contested by a bystander who might assume the role of the winner albeit fraudulently so. Also, any wagering machine that delivers cash money to the winners and is located without intimate security protection is a vulnerable source for the criminal in that of necessity the wagering machine would be obliged to inventory a sizable amount of money as pay-out should an early win occur, i.e., Vegas slot machines. It would be hard to imagine any privately owned location (store) owner being comfortable with a wagering machine on his premises that carries large cash inventory.

Casinos operate to provide the controlled environment for such machines. These casinos have very large slot machines that have capabilities of huge sum wins (up to $1,000,000). In that casino guards are in saturation, the win status as exposed at the wagering machine readout, the win is fairly secured to the winner, however only if the winner drapes his body around the machine until the guard(s) appear and correlate the winner to the win. Should the winner leave the machine in search of a guard he may find another body claiming the win. Where the true winner is identified to all satisfaction, he has the choice of redeeming his win from the cashier of the casino (no slot could possibly pay out huge sums) by demanding cash or a casino check drawn to his name (identifiable). In most all cases the check is the vehicle because of its inherent security.

Also, an essential value to any game play where entertainment is a strong motivating force to the player is that it be visibly novel and unique. Much of the video-arcade enticement today is the novelty of the use of the various, not before applied, elements that are peripheral to the play itself, i.e., Pac Man uses a Joy Stick for screen character control and has a musical score that is truly reflective of the screen action.

While efficiency, security and novelty are of general concern a principal concern of municipal governments is the abuse by the underage. The strongest arguments proferred against the wide use of wagering machines is that children will engage in a practice where there is no attendant. Accordingly, such machines may be restricted to limited access locations such as Bars—Liquor stores etc., that restrict access by children which results in reducing market participation by those who do not frequent either Bars or Liquor stores.

Accordingly, there exists a need for a lottery system that will operate efficiently and safely, one that is novel, accurate and will instill confidence in the players, and provide for widespread use yet capable of controlling the playing thereof by persons excluded by the rules and regulations of the game.

SUMMARY OF THE INVENTION.

It is a principal object of this invention to provide an automatic type lottery system, predetermined as to fairness and operating efficiently and safely and which is capable of issuing a winning check or a receipt for a future event or a loss.

It is another object to provide a lottery system having a choice of games with an instant readout of the odds for each game.

A still further object is to provide different amounts of wagering and a confirmation of the eligibility of the player to wager.

A yet further object is to provide the player with an instant determination whether the play was a winning one and the verification of a win.

Another object is to provide for the accurate recording of all wagers made, winnings distributed and other information essential for accounting purposes.

A yet further object is to provide for maximum security of the playing unit's operators and the winners by generating winning checks.

All of the above objects and more are realized by the automatic lottery system of the present invention which envisions the use of many player consoles at widely dispersed locations communicating with as many multiplexer preprocessing units as necessary to tie together into with a central computer. The player consoles would be located at various points about an area and would allow a player to play in a lottery with the central computer determining the winning percentage of players from the total numbers played. In a sense, the players at each player console are at the time of play competing at that instant for a percentage of the amount played with the winner receiving an immediate pay-off.

In view of the foregoing, the present invention's check printing capability provides for the winners security and that of the wagering means operator, by issuing checks or receipts to the player identified rather than cash. The advantage to all concerned becomes most evident where either the winner or the amount won is in debate. Resolution is immediate and unequivocable when the win and winner is verifiable.

The player console of the present invention advantageously provides for, inter alia, the feature of check delivery that provides a novel means for paying-out to winners. The excitement and/or anticipation of a check being printed where, in certain instances, the dollar amount or win value may not be known to the winner until the document is completely printed and delivered. Moreover, the present invention provides for the delivery of a receipt for a future event result or a win payout incorporating the security of a personal identification of the recipiant.

In addition, the check pay out can be used as a means for conveying a printed message on its face or on its stub. The check as the viable proof of a win etc., may be quasi-negotiable as any commercial bank check. The issuance of a check rather than coins or currency, reduces the stigma that is associated with slot machines. The convenience and safety in issuing high level wins is a very desirable feature in the gaming business. Where out of town winners (out of country also) are concerned, the redeeming of their win by any other means other than a bankable win check (at their bank of residency) makes the collection not only a total inconvenience but requires a substantial time lapse from time of win to point of collection, and would therefore have an inhibiting effect on initial and/or continued play.

Furthermore, the check identification system can advantageously weed out any underage or otherwise incompetent players such as employees etc.

Moreover, should an administration declare limits to the number of plays per day per person, or a dollar limit, then by the computer function and memory, any win that occurs where either limits are exceeded can provide for an invalidation of the win at time of win check collection approval.

Also, the design of the win check can be of such nature as to act as an information vehicle whereby instead of it being cashable into dollars it may be so printed as to act as a right to it being redeemed for a product, credit against purchase of a product or service, or an accumulation of same leading toward a win of some nature.

In addition, should an identifiable win check become strayed, lost or stolen, then an alert to the verifying tape record will reject payment of any unauthorized attempt at its processing for payment.

Further, in many present day State lottery practices in particular, an amazing amount of win funds are not claimed for one reason or another. There is no way the lottery administration with every serious effort can determine as to who may be the owners of the unclaimed funds. The tape record can be referred to where for example checks have been issued but not cashed and a published list of the identification numbers as recorded would lead toward a complete win pay out.

Also, if a player engages in continuous play in the present system, he may deposit his total game fund into the system and play from his bank. As wins (or losses) occur the bank will change the balance accordingly. At the end of the session, should the balance be of sizable nature the player may advantageously receive a cashable and identifiable check.

Also various instant pay off games may be incorporated along with paramutual or other type wagering for winning pay offs at a later time.

BRIEF DESCRIPTION OF THE DRAWINGS

These and other objects and advantages will be realized by the present invention, the description of which should be taken in conjunction with the drawings, wherein:

FIG. 9 is a perspective view of the player console; and

FIG. 10 is an example of a winning check which may be instantaneously printed out by the player console.

DETAILED DESCRIPTION OF THE DRAWINGS

Figure 1:
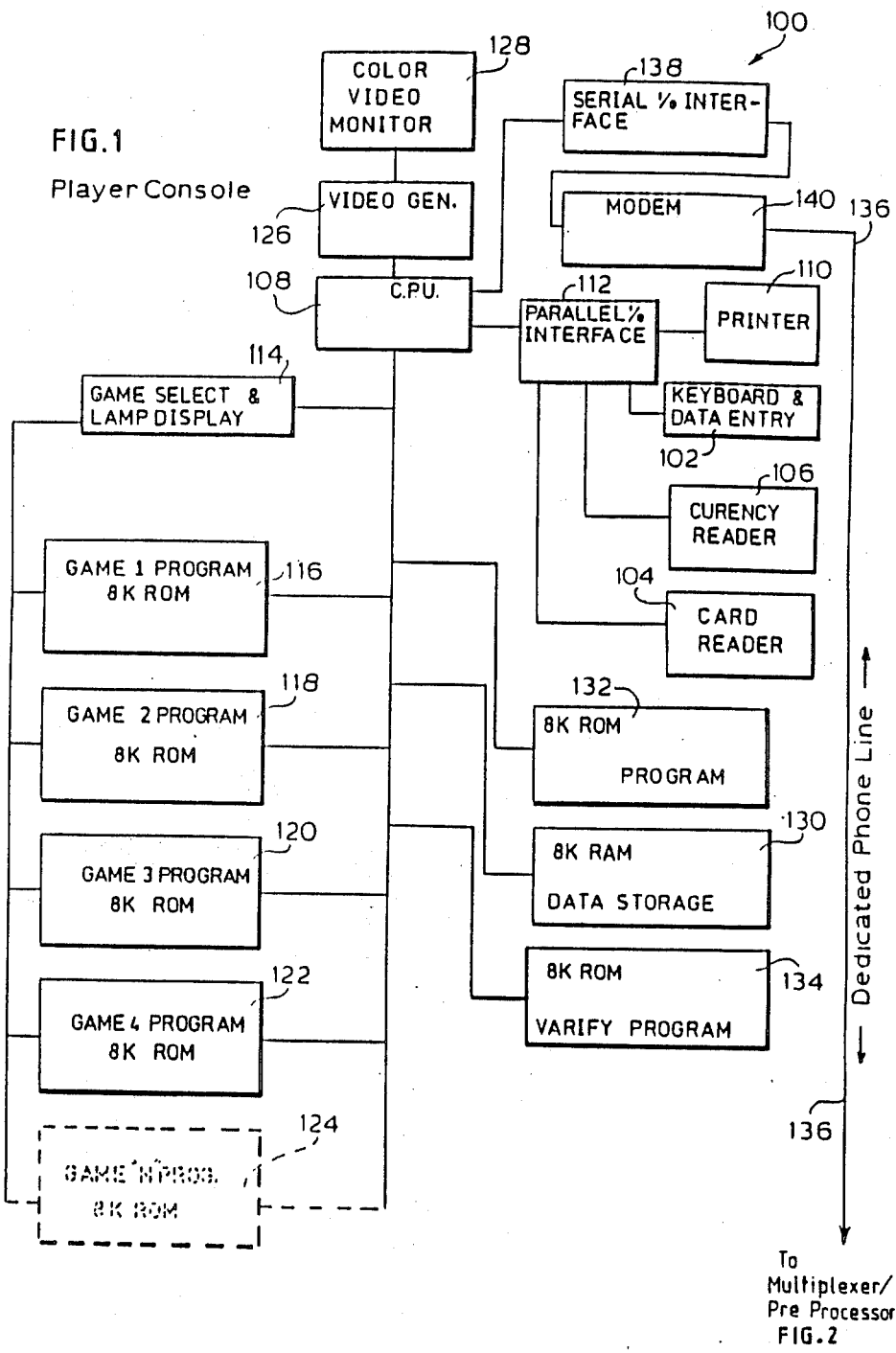
FIG. 1 is a box diagram of the various components of the player console.

In regard to FIG. 1, the various components of the player console 100 are shown. The player console is equipped with a keyboard and data entry means 102 discussed more fully with regard to FIGS. 7 and 8. However, this may be a push button or a set of rotary thumb-wheel switches or any other means suitable for purpose and would provide a means for the player to identify himself through the input of an identification number of some nature, perhaps a social security number, a driver's license or some similar type of identification. It would also allow the player to enter numbers or make selections of his choice when required by the particular game selected.

To further facilitate player identification, the player console may be equipped with a standard type of card reader 104 enabling a player to identify himself by merely placing his encoded card etc., into the machine. Various models and types of card readers are available from many manufacturers, such as the Hickok Electrical Instrument Company. For example, Holorith code readers of the type developed by I.B.M. require the card to be encoded with punched holes, when light passes through a hole; a photo-detector on the other side of the card is activated. The pattern of activated photo-detectors is decoded to retrieve the Alpha-Numeric data encoded on the card. Bar code readers may also be utilized and are of the type used by National Cash Register Company which scan a card, label, envelope, or other printed item, by mechanical or electrical means, with a photo-sensitive device, such as a photo-transistor, photo-diode, or photo cell, to decode a series of wide and narrow printed bars, with varying spacing to decode and retrieve the Numeric data encoded thereon. Also, Magnetic Strip readers can be used which scan a strip of iron oxide material, which has been recorded, much like an audio tape recording, with numeric data in a digital form, with a magnetic head, much like the head on an audio cassette player. Examples of current uses of Magnetic Strip encoded cards are American Express cards, and 24 hour electronic banking customer access cards.

Since this is a wagering system, the player console would also be equipped with a currency reader 106 which would receive, verify, register and accumulate monies in the form of coins, paper currency, or magnetically or bar encoded type credit cards or possibly even tokens. This mechanism could be of any standard type of currency reader presently on the market. While the type of currency readers utilized is not particularly important, a currency reader is necessary since the system envisions the simultaneous operation of multiple game pools based upon the price of play, e.g., 25 cents, 50 cents, 75 cents and one dollar. Each of the amounts represent a particular game pool for each of the non-paramutual games. If an encoded card is used in conjunction with a multiple game option, the appropriate coding switches could be available for the player to select the game pool desired.

If for example the player deposits 25 cents in a player console, the winners would be determined on the basis of all those who had played in that particular game pool, which would be 25 cents. This requires that the currency reader determine the varies amounts played so that the player would be placed in the proper game pool. A means for such determination might be where the first quarter entered enables the player terminal and that each coin therafter increments one bit on a data byte held as one bit in a quad latch. For example, a 7475 type T.T.L. digital integrated circuit which is an industry standard manufactured by Texas Instruments, Signetics, Motorola Semiconductors, Fairchild Instruments, and National Semiconductors and enables the next latch. This continues until the last coin or digit is entered at which time the send key would be enabled. The player console would be equipped with a console processing unit 108 possibly of the Cromemo Z-80 type or equivalent which would receive this data and coordinate information ultimately sent on to a multiplexer/preprocessor. This could be a micro-computer, based on the Z-80 microprocessor (Z-80 is manufactured by Zilog Electronics), utilizing the industry standard S-100 data and address bus, manufactured by Cromemco, and marketed by Newman Computer Exchange, 1250 N. Main St., P.O. Box 8610, Ann Arbor, Mich. 48104.

However, it should be noted that the system can be of the design to have just a single lottery pool, for example, 25 cents, then the currency counter and data determination could be of a relatively simple nature, merely enabling play upon the deposit of 25 cents rather than determining the various amounts played so the player pool could be determined.

The player console would also have an electro mechanical printer 110. The principal function of this printer would be to print checks, paramutual receipts and possible verifications under the control of the microprocessor having the attendant advantages as previously discussed herein under the heading Summary of the Invention. The incorporation of the system will be more particularly discussed herein.

This printer may be along the lines of the type that prints characters as full characters, like a typewriter, or as combinations of dots which create the characters. Printing may be accomplished by the use of a type cylinder or ball, such as is found in an I.B.M. "Selectric" typewriter, or solenoid pushed wires to print the individual dots in a dot matrix printer, or by electrically controlled ink jets which spray ink onto the paper, or by electrically burning a coating on a specially treated paper.

Electromechanical printers are available from many sources including companies such as C. ITOH Electronics, Inc., Southwest Technical Products, Datel Systems, Inc., Fluke Mfg., Co., N.E.S., Inc., and many others marketed by Newman Computer Exchange, 1250 N. Main St., P.O. Box 8610, Ann Arbor, Mich. 48104.

The printer 110, keyboard and data entry means 102, currency reader 106 and the card reader 104 all may communicate with the console processing unit 108 by way of parallel input/output [I/O] interface 112. This may be for example of the type, Model No. P104-4 by IMSAI Electronics marketed by Newman Computer Exchange, 1250 N. Main St., P.O. Box 8610, Ann Arbor, Mich. 48104 or equivalent. In the case of the P104-4 is a four part, 8 bit parallel input/output interface, which permits a digital electronic device to interface with any computer utilizing the industry standard S-100 data bus by presenting an 8 bit data word on 8 separate lines, one for each bit, so that the entire 8 bit word is presented at one time, with the 8 bits parallel to each other.

Information from the various components of the player console can be translated by a field programmable logic array into coded characters which can be used and interpreted by the console processing unit 108 as later discussed.

Figure 8:
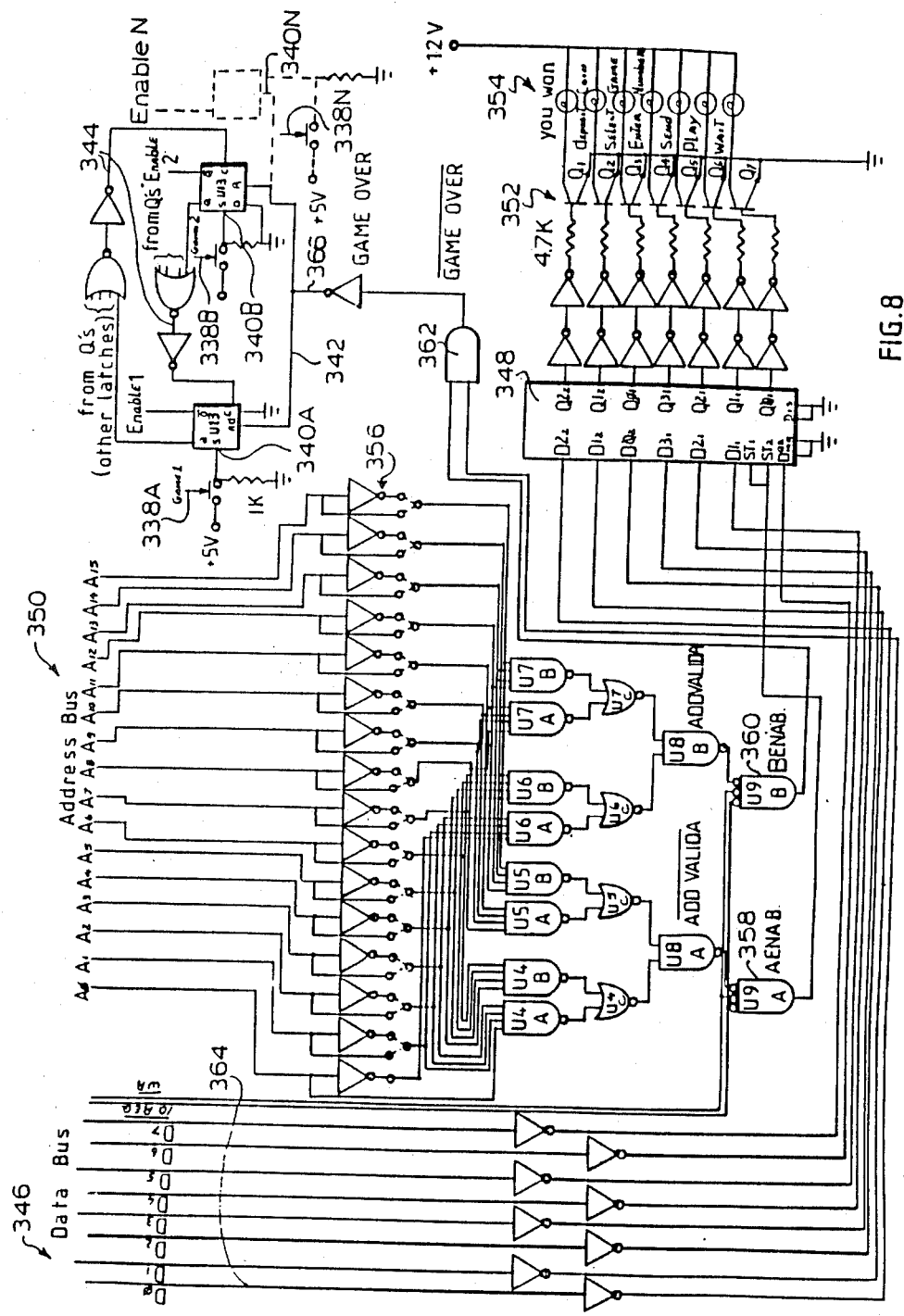
FIG. 8 is a schematic of the game selection and lamp display logic of the player console.

The player console would also have a game selection means 114 allowing the player to choose between, for example, bowling, darts, dice or cards etc., (further discussed with regard to FIG. 8). The number of choices would vary according to desire. The game choice is important because it will effect the player's amount of winning. This is due to the fact that each game has within it game pools in the amounts of 25 cents, 50 cents, 75 cents and one dollar from which a winner is determined.

Each of the games would be coordinated by a program contained in the console processing unit 108 as shown by programs 116 through 124 stored in read Only Memory (ROM) with 124 representing the arbitrary number of game programs which may be provided in the console processing unit. Depending upon the particular game selected, the console processing unit would coordinate a video generator which may be a Cromemco TV dazzler 126 which is a device manufactured by Cromemco, Inc., and marketed by Newman Computer Exchange, P.O. Box 8610, Ann Arbor, Mich. 48104 and others, which generates a composite color video signal from instructions and data received from any computer utilizing the industry standard S-100 data and address bus, or equivalent type, with this signal being utilized by a color video monitor 128 which would perhaps display game animations for the different games as well as other data. This monitor 128 may be merely a color television set, without a radio frequency tuner, which receives a composite color video signal and displays a picture on a color picture tube and are manufactured by Sony, Panasonic, Sanyo, J.V.C., etc.

Also, there may be animation, digital in nature similar to that used in TV games presently on the market.

In addition to the animated games, the console processing unit 108 might maintain a display of statistical data and current game information on a type of split screen means, perhaps with the animated game on the bottom portion and the statistical data on the top. The statistical data would originate in the central processor as later discussed with regard to FIG. 2. The statistical display would include a number and dollar amount of winnings to date, for the particular day or week for each game, paramutual win, place and show for all kinds of paramutual games and every 24 hours or other convenient period this information would be continually updated by the central processor. In addition other information would be displayed such as the current player number which was entered by the keyboard or encoded card, current game being played, current dollar amount being played, or if a paramutual game is being played, a paramutual number being played, and the current amount at that particular price. This latter information may be supplied by a data storage Random Access Memory RAM 130 in the console processing unit itself and may be of the INSAI type or equivalent. This may be obtained from any manufacturer of small computers e.g., S.W.T.P. etc., which usually manufacturers RAM, which interfaces with an S-100 computer bus, also usually manufacturing S-100 bus computers, previously mentioned. Both can be acquired from Newman Computer Exchange, P.O. Box 8610, Ann Arbor, Mich. 48104.

In addition, a Read Only Memory, ROM 132 would provide an operational program for the player console 100 and could be of the Cromemco type or equivalent, and would control the overall functioning of the player console. Further, a means for verifying a winning check or paramutual ticket, could be accomplished by a key switch or the like enabling a verifying program 134, which may be of the same type ROM memory 132, and later discussed. Note that all of the memories 116–124, 130–134 are shown interfaced to the central processing unit 108, which operates on the programs and data contained therein.

All data fed into the console processing unit 108 would be sent to a multiplexer/preprocessor and ultimately to the central processor. To facilitate the communication between the player console and the multiplexer and to allow for the use of telephone lines 136, a series I/O interface 138 of a ISMAI 5102-2 or equivalent type, available from Newman Computer Exchange, and others could be used in connection with a standard Western Electric modem 140 or its equivalent.

If any other means of communication is desired such as a fixed wire connection, radio or microwave systems, laser and optic fiber libes, or any other means of duplex data transmission which may be desirable, then appropriate hardware can be eliminated or added as necessary.

Figure 2:
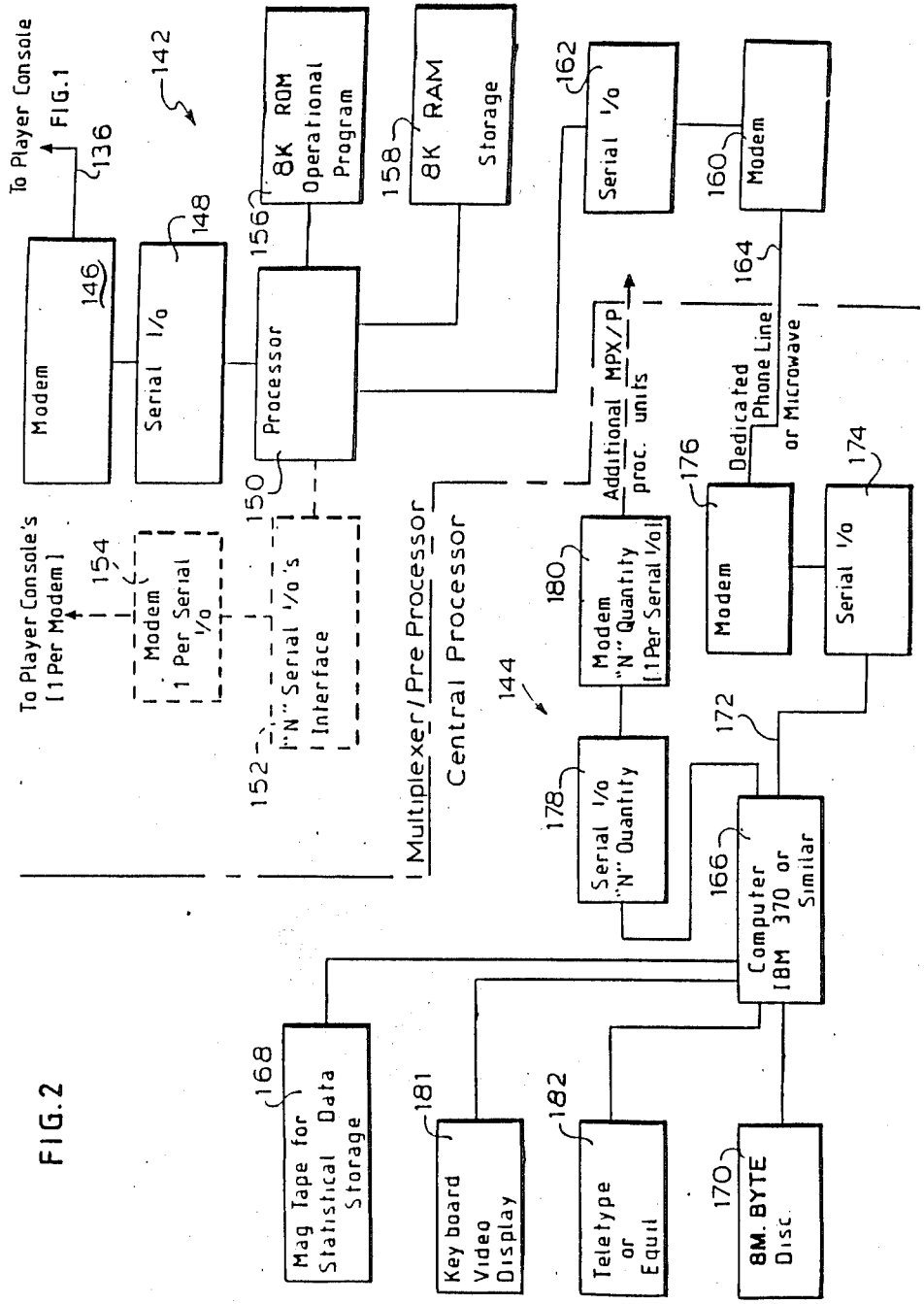
FIG. 2 is a box diagram of the various components of the multiplexer/preprocessor and the central processor.

In regard now to FIG. 2, the various components of a multiplexer or multiplexer/preprocessor 142 as used within the system are depicted in conjunction with the central processor 144 and its related apparatus. The multiplexer/preprocessor 142 function would be to funnel data received from the player consoles 100 at a slow rate and retransmit it at a high rate to the central processor 144. In the case of data originating in the central processor 144, such as the winning number etc., the multiplexer 142 would work in the reverse order and would receive the data from the central processor 144 in the form of a short burst of data and direct it as a slow data stream to the player console. As aforementioned the system envisions the use of low cost audio quality data lines 136 i.e., standard telephone lines to communicate information to and from the player console 100 and the multiplexer 142. To facilitate the transmission to, and receiving of data from the player console, a Western Electric modem 146 or equivalent would be provided and used in conjunction with a serial I/O D.E.C. interface 148 or any other intermediate or low speed data interface compatible with the modem. This serial interface 148 or one manufactured by Digital Equipment Corp., Maynard, Mass., and can be used in conjunction with a minicomputer or processor 150 which may be of the P.D.P.-11 series manufactured by same, and having a 16 bit word length.

The number of multiplexers 142 would depend on the number of the player consoles 100 connected thereto and the hardware actually utilized. Since each player console 100 would be tied into the multiplexer 142 in a similar fashion to the one depicted, the actual number will vary with the capacity of the multiplexer and/or the usage of the player console. In this regard, the "N" serial I/O interface 152 and corresponding modem 154 represents the number of possible tie-ins to the multiplexer. It is presently felt that the number of player consoles per multiplexer can vary from 256 to as little as 32 based upon the projected data rates and player console usage, 256 being the maximum in a low usage situation with 32 in a very high usage. Of course, these numbers may vary depending upon the actual hardware used and the potential developments in such hardware.

In addition, the multiplexer 142 would have as part of the minicomputer 148, an operational program 156 contained in a ROM, a maximize security. Also a RAM 158 would be provided with sufficient storage for operation and to store data for retransmissions between the player console 100 and the central processor 144.

To transmit and receive data from the central processor 144, a standard Western Electric modem 160 along with a serial I/O D.E.C. interface 162 or equivalent high speed interface may be used, and allows for the use of standard communication lines 164 i.e., telephone, data lines therebetween. Of course, as aforementioned an alternate means of communication may be utilized with appropriate adjustments in the types of hardware, if so desired, or required.

As shown further in FIG. 2, there is depicted the essential workings of the central processor 144 incorporated in the present system. The key elements of the central processor 144 should be a central computer 166 of sufficient speed and word length to efficiently control and maintain statistics on the entire system. This could be an I.B.M. 370 series or similar computer equipped with perhaps a conventional magnetic tape 168 manufactured by the 3M Company and/or disc storage units 170 capable of maintaining a permanent record of all system statistics. Of course, the size or capacity of the storage must be selected for the particular system since speed and data capacity requirements increase with the size of the system. Therefore, it should be understood that the type of hardware set forth is used merely as an example since it is impossible to define the specific computer or mass data storage until the size of a specific system is determined. Manufacturers of large scale computers can provide mass data storage systems in a variety of speeds and byte capacities, and selection of storage mediums can be made after the selection of a computer, which should be selected after the size of the system is determined.

The central processor 144 can be equipped with a serial duplex I/O data line 172 interfaced to the communication lines 164 to the multiplexer 142 via any compatible standard serial I/O interface 174, with a compatible modem 176 capable of allowing an eight bit digital code (ASCII) transmittal.

Depending upon the number of multiplexers needed or desired to be tied into the central processor 144, similar communications can be established via serial data I/O interfaces 178 with compatible modem 180 with "N" representing the actual number of multiplexers tied in and having a maximum of 152. Again this maximum is an estimate based on the projected use of the system and may vary according to actual use and/or actual hardware utilized.

To allow access for programming or a display of statistical or diagnostic data requests etc., the central processor 144 would be provided with a keyboard terminal 181 perhaps coupled with a video monitor in a single data terminal such as those manufactured by Teletype Corp., 5555 Touhy Avenue, Skokie, Ill., 60676; Digital Equipment Corp., Maynard, Mass., Itoh Electronics, Inc., 280 Park Avenue, New York, N.Y. 10017. Alternatively, a separate typewriter type keyboard may be used with incorporated electronics to communicate with a computer using an industry standard code, such as A.S.C.I.I. or E.B.D.I.C. and an electromechanical printer and/or a video display unit capable of receiving data in the form of an industry standard code and displaying it on a cathode ray tube (T.V. type picture tube). Such keyboards, printers, and C.R.T. data display units are available from many manufacturers, or may be designed for this particular application using technology which is currently readily available. In addition, the printout of such data may be provided by a teletype or equivalent machine, 182 of the kind manufactured by the Teletype Corporation, 5555 Touhy Avenue, Skokie, Ill., 60676, if so desired.

Figure 3:
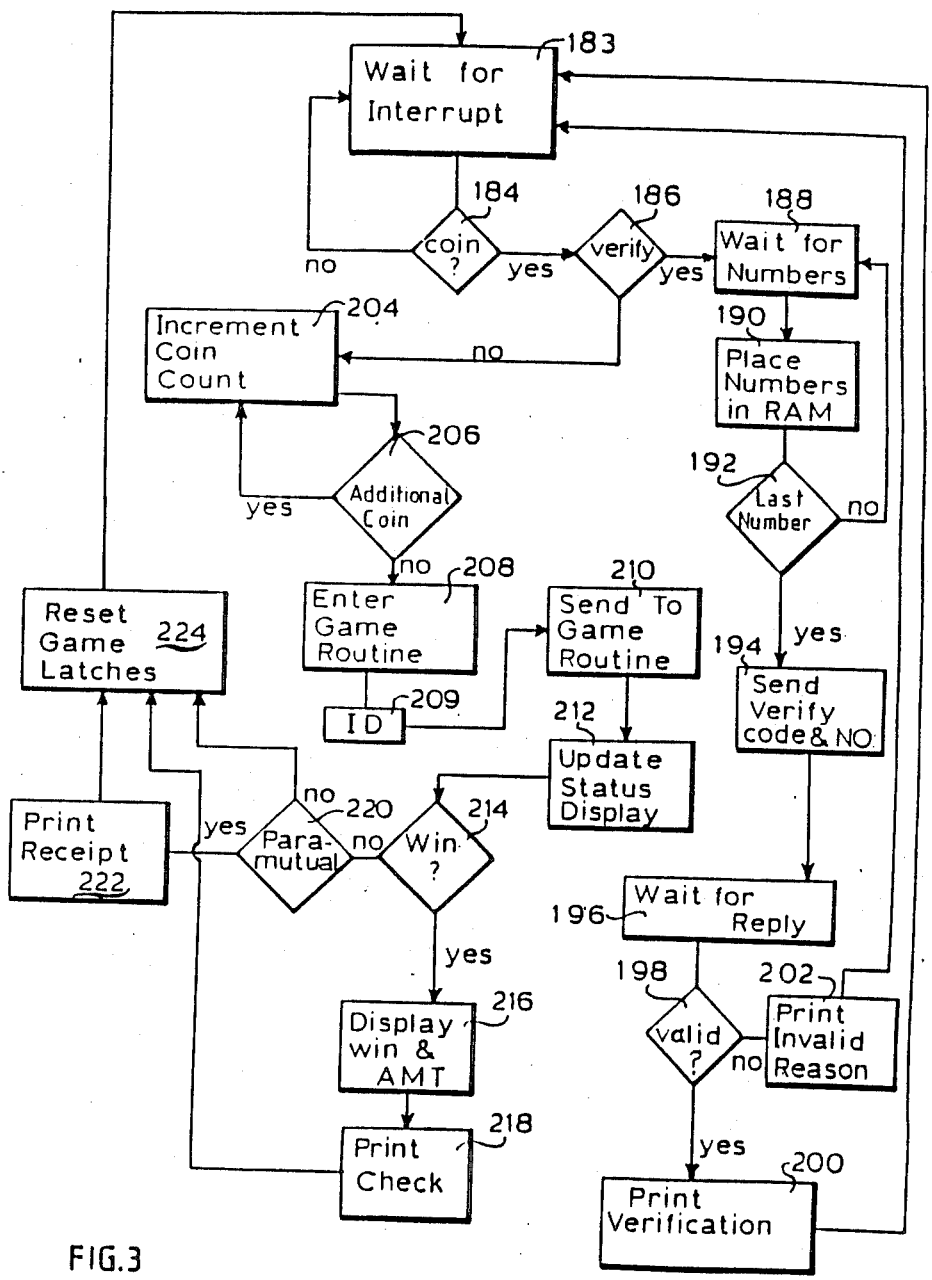
FIG. 3 is a flow chart for the player identification program and depicted in conjunction with a flow chart of the operational program of the player console.

Since the player console 100 performs a number of functions including game selections, currency reading, printing of winning tickets and paramutual receipts, and the verification of such checks and receipts, appropriate flow charts with the various operations are set forth. In this regard, FIG. 3 represents an overall operation of the player console and is discussed in conjunction with the previous figures. As shown the player console 100 when not in use will remain in an operational status 183 maintained by ROM 132. The deposit of a coin, currency or encoded credit card 184 will enable the player to select the desired function he wishes the player console 100 to perform. If the player wishes to verify the previously printed winning check or paramutual receipt, he would engage the key switch to enable the verification routine 186, controlled by ROM 134 aforementioned. If it was desired that the player be charged nothing for such verification, then the enabling of the verification routine 186 might also signal a coin return. Alternatively, verification routine 186 may be enabled by a key switch without deposit of a coin.

Once the verification routine 186 is engaged, the video monitor 128 of the player console 110 could display that the machine is verifying and request that the receipt number for the paramutual game or the winning check be entered along with the player's identification number. This may be done by perhaps the keyboard 102 and the player console 100 will now wait for the completion of the entry of the numbers 188. As the numbers are entered, they are placed into the RAM 130 with this operation designated by box 190. When all the numbers are entered 192 the player console 100 transmits the verifying code 194 and identification number and check or receipt number, to the central processor 144 via the multiplexer 142. The central processor 144 will determine whether the particular player was a winner (see FIG. 6 later discussed) during which the player console 100 waits for a reply 196.

The determination by the central processor 144 is sent to the player console which can then indicate verification 198, by perhaps providing a readout of the data on the video monitor 126.

In the case of a verification of a winning check a readout of the validity merely confirms to the player that he has actually won. In the case of small winnings, for example, ten to twenty dollars where it may be desirable to redeem them locally, the printer 110 of the player console 100 could print out a verification 200 of the winning check immediately. This may be done on tissue paper which would be a duplicate of the check and could be superimposable upon the winning check. Both the check and its verification would enable the player to tender it locally for a quick payment. The local redeemer upon receiving the check and verification would then be assured on its genuineness, confident that it is not a mistake or a forgery.

If, however, the winning was invalid, this could also be shown on the video monitor 128 along with the reason for its invalidity. The reason for the invalidity could be printed out 202 for future reference by the player which could be enabled by appropriate signals to the printer.

It is also within the contemplation of this invention that the verification can also be done by a machine not incorporated within the player console 100. If it was so desired, an independent verification method might be employed such as a facsimile system, which transmits a photo-duplicate of the ticket to the central computer, in much the same manner as is currently used by the Press Wire services to transmit "WirePhotos", or perhaps an Exxon Corporation product known as QUIP wherein the player or person from whom the redemption is sought would place it on a send unit transmitting it's image to the central processor, via WATS lines, and receive back a tissue duplicate of that image sent if it was authentic. In any case, the tissue may have a pressure sensitive adhesive on one or both ends so that it can be easily superimposed and attached to the original check at the time of redemption.

With regard to the verification of paramutual or other non-instaneous tickets, since the wager is based upon non-instantaneous determination of the win, the ticket is merely a receipt of the wager made. Once the winners for the particular games are determined then the player can, by entering the receipt number, identification number, receive a comparable verification as that of the checks. However, in that the amount of the win is based upon the amount played and is not available instantaneously, the verification is additionally important in that it would provide the player with a readout of the amount won and a check for the amount won.

Similarly, an independent verification means separate from the player console could be employed as in the case of winning checks. Of course, if the paramutual ticket was not a winner, the ticket itself would act as a receipt for the amount lost.

During the time the player console 100 is maintained on an operational status 183, the video display on the monitor 128 could be continually updated, showing various statistical data. Also, after a coin has been deposited, a play routine may be engaged rather than the verification means, by an appropriate key. If this is the case, the currency reader 106 will now determine the amount played by perhaps incrementing a counter 204 and an appropriate game pool could be registered and stored. Incrementing can be done in any standard method. For example, if quarters are used, the first quarter would enable the player console and as each quarter 206 is entered, the data could be stored in a four bit shift register. Then as each digit is entered, it is held in a latch, as BCD data, then the next latch is enabled. This will continue until the last digit is entered. A send key could be enabled as to the deposit of the first coin, so that in any point of entering coins 25¢, 50¢, 75¢ and $1.00, the players can send the data to an appropriate game pool depending upon the amount deposited at that time.

In paper currency is used, then incrementing a counter may be unnecessary. In addition, if an encoded type credit card is used, the amount which the player wishes to play can be signaled to the console processing unit 108 by the keyboard 102 or appropriate game pool signal switches on the player console 100.

Once the desired amount has been entered, the player could then select via game select 114, the appropriate game he wishes to play 208 and then enter his identification number 209 by way of the keyboard 102 or by an encoded type identification card. This would enable the particular game routine stored in the ROMs 114–124, of the player console 100. If the game requires the entering of numbers the video monitor 128, in accordance with the appropriate ROM, will instruct the player to do so. If not, then the data entered would be transmitted to the central processor 144 via the multiplexer 142 by engaging the send signal 210. The information sent should include the amount played and the game selected in addition to perhaps a player console code, license code, time of transmission, and player identification number which could be normally sent with each transmission from the player unit.

At this time the central processor 144 will record all information and update the statistics on the game played 212, which would then be displayed on the player console monitor 128 and if it is an instant game, give the status of the play as a win or as a loss 214.

Upon the receipt of a win code from the central processor 144, the player console 100 could activate a visual indicator notifying the player of a win and the amount won 216. It might also be desirable to have a combination audio/visual notification of the win to stimulate additional players. If the player console 100 received a losing code signal, then by way of a visual or audio/visual message, indicate the loss to the player. However, to stimulate further play the central processor 144 could also signal that there has been a winner in the system elsewhere.

In addition, and as an alternative, the player console 100 upon a receipt of a winning code may proceed to print a winning check 218 via printer 180. The printing of which has all the attendant advantages aforenoted. The printing of the check by the player console 100 could be enabled by a win code transmitted to the player console 100 by the central processor 144. The check would bear all the information involved in the play and could be drawn upon the account, perhaps of the agency of the state operating the system, with the check payable to the person who can identify himself as the person associated with the identification number printed on the check. Deduction might be made from the check for taxes depending upon the applicable law. These deductions could be precomputed for each possible prize value. Furthermore, the check printing feature offers security reliability and versatility for the system as aforenoted.

Also, rather than printing a negotiable check, the player console 100 might print a winning ticket encoded with the same information but in a non-negotiable form. This ticket could then be redeemed at a prescribed location.

In the case of the play of a paramutual game 220 the central processor 144 could similarly record all the information transmitted and transmit back to the player console 100, a signal to print a paramutual receipt 222 which could be redeemed after a winning ticket was later determined.

When the player console 100 completes its function by the printing of a winning ticket or a paramutual receipt, or the indication of a loss received from the central processor 144, the operational program will reset 224 the game select latches 114, at which time the player console 100 will revert back to an operational status 182.

Figure 4:
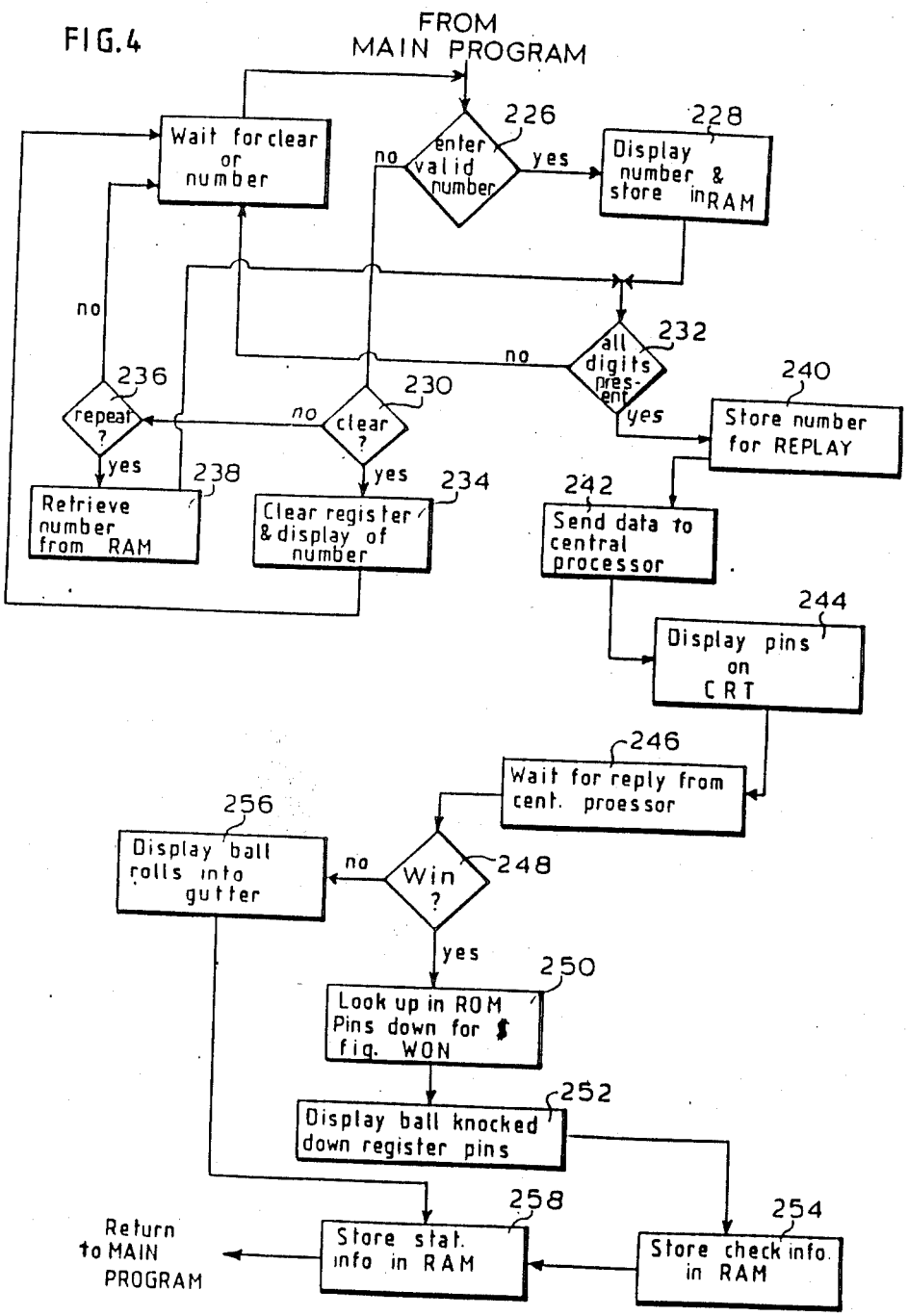
FIG. 4 is a flow chart for the player identification program and depicted in conjunction with a flow chart for an instant win nonparamutual game program.

Turning now to FIG. 4 there is shown an example of a player identification routine depicted in conjunction with an example of an instant win nonparamutual game program which may be ROM's 116–124.

Once the player console 100 is enabled by a coin or other means, the monitor might "enter numbers" 226. The player might now enter by way of the keyboard, encoded card or other switch as aforementioned, some number which will provide identification of him for the particular play. In this regard a valid number would be an integer and not a function such as a clear or a repeat signal from the keyboard as discussed with regard to FIG. 7. This number may be his social security number, United States Visa number, telephone number or other such number which may be determined to be secure to identify the player. If it is found to be undesirable to have a complete identification number of the player, then a partial number could be entered, for example, the five digits of this social security number or passport number, etc.

As the player enters each number, it is displayed 228 on the monitor 128 and also stored in the RAM 130. As each digit is entered, the console processing unit 108 will wait for a clear signal 230 or an additional number until all the necessary digits are entered 232. The amount of numbers necessary for a proper identification of the player may be predetermined and could be changed depending upon usage.

By displaying the numbers as they are entered, it enables the player to be assured of a proper identification. If the player mistakenly enters the wrong number, a clear signal could be provided via a key or switch to clear either the last entered number or the entire number. This procedure is presently employed in many standard keyboard calculators using a "C clear" and a "CE" clear last entry key. When the clear key is activated it would signal the console processing unit to clear the display and the registered numbers 234 as aforementioned.

In addition to the clear key, the player console could be provided with an additional function of allowing for a repeat play 236 without the necessity of entering the identification number. A repeat key or switch would signal the console processing unit 108 to retrieve 238 the immediately prior identification number from the RAM 130.

Once the player has completed the entry of his identification numbers, the numbers would then be held in the RAM 130 for display and repeat purposes 240. Then the monitor 128 via the ROM 132, would instruct him that the data is ready to be sent to the central processor 144 by a send key or switch. When this is activated, the information would then be sent 242 to the central processor 144 and at this point the send key would also enable the preprogrammed game routine ROM's 114-124 here being for example, bowling. The game animation may be digital and the bowling program would be displayed on the video monitor as bowling pins 244.

The player console would then wait 246 for a signal from the central processor 144 of a win or a loss. If a win signal is received 248 along with it could be the amount of the winning. Accordingly, the game program ROM could contain a number of pins to be felled relative to the amount won 250. This would then be displayed on the video monitor as a ball knocking down the predetermined amount of pins 252.

The initial win signal from the central processor 144 would also include all the data necessary for the printing of a winning check. This information upon receipt would be stored 254 in the RAM 130 until the completion of the video display. Even if an instantaneous printing of all tickets was desired, this data should also be stored in the RAM 130 so that data rates of the modem 140 need not be slowed down to drive the printer 110.

Alternatively, if the central processor 144 sends back a losing signal then the game program would provide for a video display of a bowling ball rolling in the gutter of a bowling alley 256.

The statistical information which accompanies the win or loss signal would be stored 258 in the RAM 130 until the video display of the game was completed and then displayed upon the monitor 128 according to the operational main program ROM 132 which is signaled upon completion of the game routine, and returns to main program operation.

Figure 5:
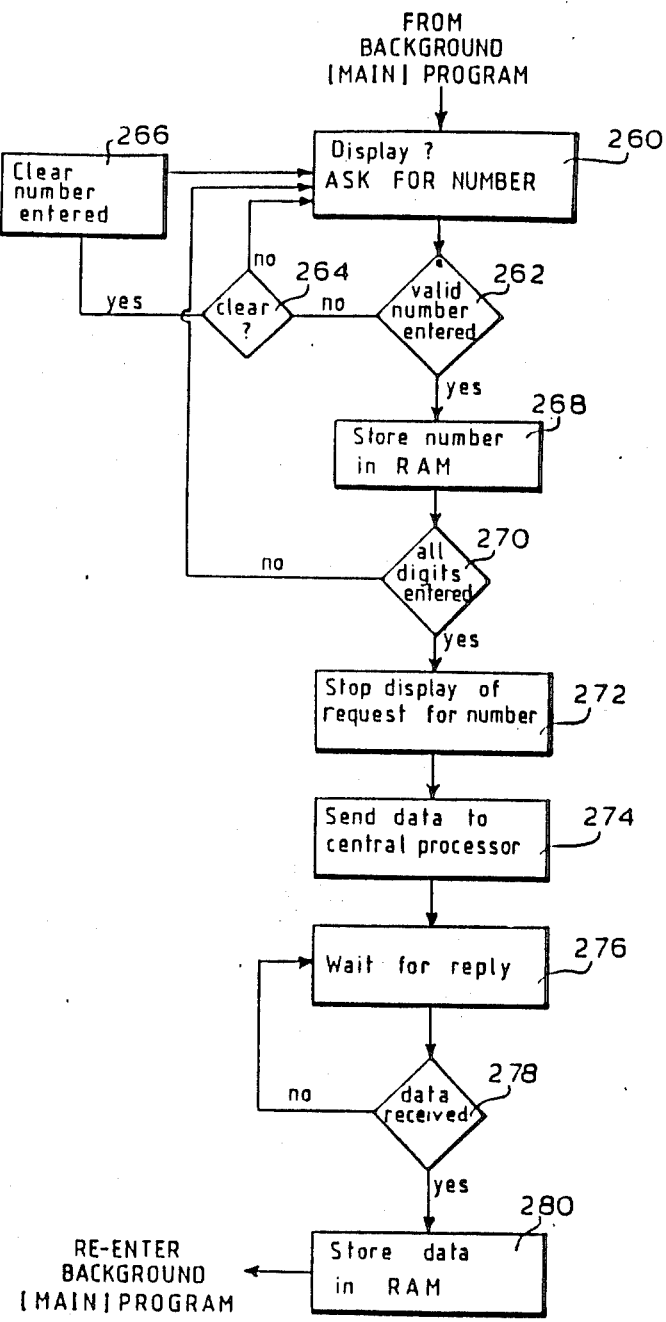
FIG. 5 is an example of the flow chart for a paramutual game routine program.

In regard now to FIG. 5, an example of a paramutual game routine is depicted. As in each paramutual game, as compared to the instant win game, the player is required to enter a number or numbers, relative to the object of the game and as instructed by the particular game program ROM 116-124 for the particular selection. A variety of paramutual number games may be incorporated into the system. For example, paramutual racing, wherein win, place and show numbers are chosen on a pseudo-random, or pure random technique on a time schedule [hourly, daily, weekly, etc.]. The win, place and show numbers may be selected as the last three digits of the total number of bets made, or dollars taken in, or by picking numbered ping-pong balls or any other random or pseudo-random manner which may be determined to be desirable. Quinella, perfecta and trifecta wagering may be incorporated by entering multiple numbers with a similar determination of the winning combination.

With each game played the played amount will determine the player pool in which the player is entered. In the different games perhaps a set minimum, i.e., one dollar amount may be required. In addition, the odds would continually change as the wagers are made and would be displayed at the player console 100 on the video monitor 128 similar to the way it is done in present paramutual wagering systems.

Upon selection of the paramutual game, its program (ROMs 116-124) would signal on the display 128 to ask the player to "enter numbers" 260. The player can do this by way of the keyboard, or switch option 102 similar to the entry of the identification number. The player must enter a valid integer and the entry of a function or a zero signal in this game will not register 262. If the player enters a number he wishes to change, this may be done by enabling a clear key or clear last entry key 264 which will clear the number(s) entered 266. Each valid number entered would then be stored 268 in the RAM 130 until all the numbers necessary for the game have been entered 270 pursuant to the game program. This signals the stop of request for numbers 272. The data already entered, i.e., player identification number, game selection, etc., along with the numbers entered for the particular game would now be sent 274 to the central processor 144. At this time, the player console 100 would be in a wait status 276. This should be shown by the monitor 128 and it would remain in such status until data is received back 278 from the central processor 144. When the data is received from the central processor it is stored 280 in the RAM 130 of the player console 100 for subsequent use in the printing of the receipt for the wager made.

Figure 6:
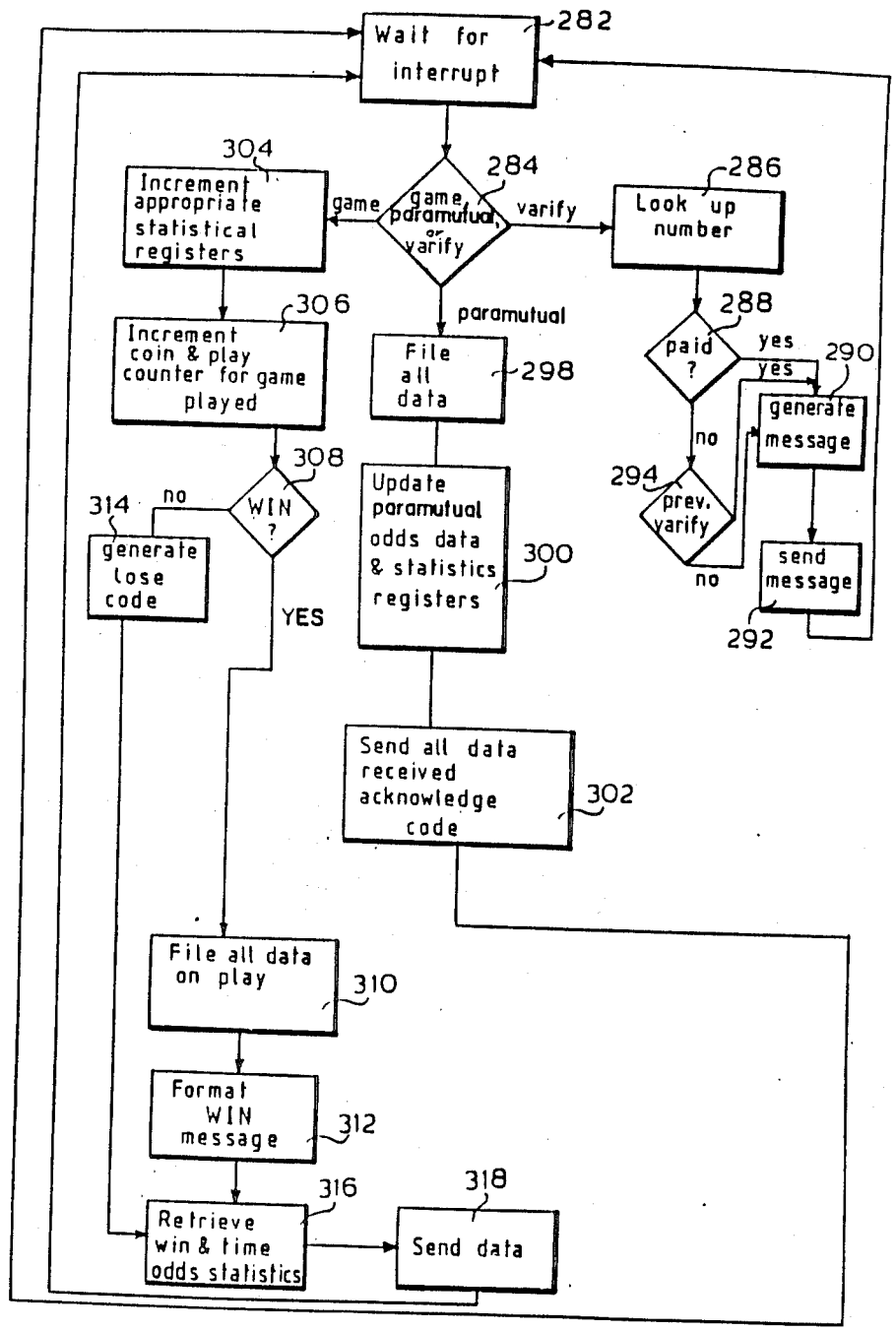
FIG. 6 is a flow chart for the central processor.

With reference now to FIG. 6, the typical routine of the central processor 144 is shown wherein it remains in an active status, awaiting a signal from a player console 282 and upon receipt of an appropriate coded signal will perform various routines according to the signal including a verification routine, paramutual game routine, and an instant win game routine as depicted 284. When the central processor 144 is signaled to verify that a particular check or receipt was a winner, it will retrieve all the data concerning the play, using perhaps an encoded check number or receipt number as a key, which would be sent along with the verification signal and the player identification number 286. Also, the central processor 144 will compare the identification number of the player recorded for that check or receipt number and the identification number of the person seeking verification. This will ensure that the person seeking verification is in fact the holder of a check or receipt. This would not be necessary if the QUIP or other facsimile system was used to verify which merely requires the placing of the actual document in the machine to enable verification.

When a check or receipt is redeemed, a record of it having byen paid would be recorded with the central processor 144. This is true also for print out verification of checks. Accordingly, the central processor 144 will ascertain if the check or request has already been paid 288. If it has been paid, the central processor 144 will generate a message 290 that a particular check or receipt was paid including possibly the date and location of payment and send this information back to the player console 292.

If it was unpaid the next step would be to determine if a previous verification print out had been performed 294. Of course, in the case of a receipt, this would be unnecessary since its verification merely provides the player with a monitor read out of the amount won. However, a verification print out of a check would provide the player with a tissue duplicate of the check which when superimposed upon a check which may be redeemed locally. To ensure the genuineness of the check only one original verification print out is provided for a check. If no other verifications have been printed out, the central processor 144 will generate a message 290 and send 292 to the player console 100 a signal to print out an original verification tissue along with the appropriate data to be contained thereon.

In the case of a second or subsequent verification, the player console would be signaled not to print a verification or alternatively to print it out the same as the original except mark it as a duplicate so that it may be used on counterfeit checks. This ensures the local redeemer of the check that it is in fact genuine and not counterfeit and that if the player can identify himself that it had not been stolen, thereby providing maximum security to not only the redeemer but also to the players in the redemption of their winnings. If perhaps the player has lost the check, if he can identify himself then appropriate means might be taken to provide him with a second check by the administrative agency.

Upon receipt of a paramutual play 296, the game code, player console code, money played code, identification number, machine license code are all stored 298 in the memories of the central processor 144, by the game code and the amount bet. Transmission of data to and from the central processor 144 could be encoded from possibly within the parameters of chart No. 1 herebelow, or any other means to ensure the proper communication of signals and data:

CHART 1

| DATA TO THE CENTRAL PROCESSOR | | | |
|---|---|---|---|
| BEGINNING OF NEW TRANSMISSION | PLAYER CONSOLE CODE* | GAME CODE | $ PLAYED IN QUARTERS |
| 1 byte ASCII BOT. | 2 bytes Code-hex. | 1 byte Code | 2 bytes Pure Binary |
| I.D. # (6 Dig) | MACH. LIC. # | PARAMUTUAL #'s BET | END OF TRANSMISSION |
| 6 bytes ASCII | 2 bytes CODE-hex. | up to 3 bytes ASCII | 1 byte ASCII EOT. |

| DATA FROM THE CENTRAL PROCESSOR | | | |
|---|---|---|---|
| BEGINNING OF NEW TRANSMISSION | PLAYER CONSOLE CODE | GAME CODE | MECH. LIC. # |
| 1 byte ASCII BOT. | 2 bytes 4 dig. hex. | 1 byte CODE | 2 bytes 4 dig. Hex. |
| WIN/LOSE PARAMUTUAL | DISPLAY CODE | PRINTER DATA IF REQUIRED | STATISTIC UPDATE | END OF TRANSMISSION |
| 2 bits | 1 byte 6 bits CODE | As Required ASCII | As Required BCD or ASCII | 1 byte ASCII EOT. |

Where a hex is defined as a number in the base 16 system (0 through E); a byte is defined as 8 bits; 1 bit is 1 binary digit (0 or 1); the (*) Player Console Code can be expanded to 3 bytes if system exceeds 65,356 player consoles; the (**) last character of printer data is an ASCII EOM (end of message); Display code is interrupted by particular game program 116-124 to determine the animatin on the Video monitor; and the Statistical update is numbers only, in pre-programmed sequence and length, with all leading 0's, in binary coded decimal.

To delineate between a paramutual and a nonparamutual game, each game is for example given a different coded signal with appropriate games also codified in accordance with the Chart No. 2 shown below.

CHART 2

| BIT | GAME CODE BYTE |
|---|---|
| 0, 1, 2 | 0, 0, 0=Win Bet 0, 0, 1=Place Bet 0, 1, 0=Show Bet 0, 1, 1=Perfects 1, 0, 0=Quinella 1, 0, 1=Trifecta 1, 1, 1=Nonparamutual |
| 3, 4, 5, 6, 7 | 0, 0, 0, 0, 0="Select-it" (paramutual) 0, 0, 0, 0, 1="Horse Race" (paramutual) 0, 0, 0, 1, 0="Dog Race" (paramutual) 0, 0, 0, 1, 1="Car Race" (paramutual) 0, 0, 1, 0, 0=Nonparamutual Game #1=Bowling 0, 1, 0, 0, 0=Nonparamutual Game #2=Baseball 0, 1, 1, 0, 0=Nonparamutual Game #3=Darts 1, 0, 0, 0, 0=Nonparamutual Game #4=Dice 1, 0, 1, 0, 0=Nonparamutual Game #5=Poker Hand 1, 1, 0, 0, 0=Nonparamutual Game #6=Black Jack 1, 1, 1, 0, 0=Nonparamutual Game #7=Original Electric Lottery |

This will ensure that the game selected is properly registered in the central processor 144 so that the proper game pool can be recorded and updated. In the case of the paramutual game upon receipt of the paramutual play appropriate registers are incremented for use in the calculation of paramutual odds similar to race track or off track betting calculations. Paramutual odds will be continually updated 302 and displayed at the local video monitor 128 of the player console. Once stored and updated, a data signal is sent 302 back to the player console enabling the printer 110 to print a receipt for the particular play. The signal to print acts as an acknowledgement to the player console 100 that the wager has been recorded with the central processor 144. In the case of any game being played, paramutual or nonparamutual, appropriate statistics files are maintained to facilitate counting and administrative procedures such as gross receipts for each unit of the system and the overall degree of utilization of each unit and other accounting data.

Upon receipt of a game signal (see chart 2) the central processor 144 will access the statistics files and, increment the memory address programmed for amount played for each particular play unit, by the appropriate amount; increment the memory address programmed as to total systems cash income register, by the appropriate amount; increment the memory address which is programmed as the total system games played, in the game pool played, by 1; increment the memory address programmed for use as a player counter for the pick of the game pool and a play unit played by 1; and increment additional statistical registers as may be required 304. These would be in addition to any filing and updating of data required by the particular game played, nonparamutual or paramutual.

As aforementioned, for each nonparamutual game, there may be actually four or more separate games. One played for 25 cents, 50 cents, 75 cents and one dollar each constituting a separate game pool within each game. The winning numbers and the amount of pay-off may be determined by the numerical order of play. To accomplish this, upon a receipt of a nonparamutual game signal, the central processor 144 will increment a register for each play in the particular game pool being played 306 and comparing the new value to a table of winning counts, which may be predetermined by the percentage of income to be returned to the players and the ratio of various size winning checks to be paid out 308. This table should be contained in a ROM to maximize security.

If the particular play is found to be a winning play, then the central processor will file all the data on the play 310 including all relevant information as to the play, and format a win message 312 to be sent to the player console 100 via the multiplexer. This win message would essentially include the amount of the winnings for the particular play. If the particular play was found to be a loser, then the central processor 144 would generate a losing code 314 to be sent to the player console and in the case of either a win or a loss, the central processor 144 at this time would retrieve all pertinent information concerning the particular play 316. At this time it would send 318 all of this data back to the player unit with either the win or the losing code to appriase the player of the results of this play and to enable appropriate functions of the player console in accordance with the signal generated.

Figure 7:
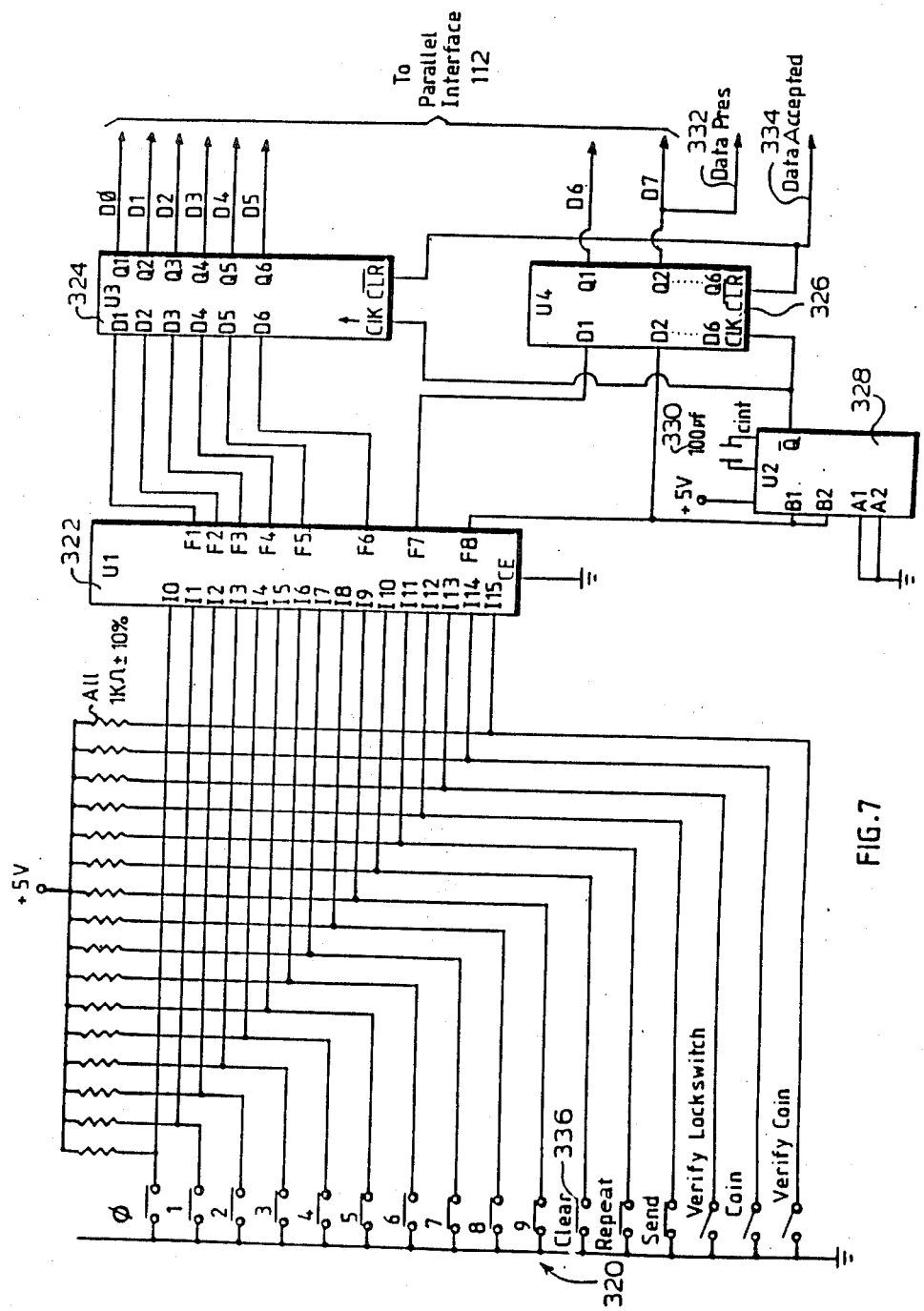
FIG. 7 is a schematic of the data entry means for the player console.

With regard now to FIG. 7 a schematic of the keyboard and data entry means 102 for the player console is depicted. This would allow the player by means of the keyboard or other switching means to enter the various numbers necessary for play. It would also provide a means of requesting various functions of the player console 100 and the system by merely enabling the particular switch. As shown, the various switches 320 would provide impulses to the "look-up table" or a programmable ROM 322 which translates it to an ASCII coded character and sends them to the console processing unit. This logic array may be programmed in accordance with Chart 3 shown herebelow:

CHART 3

| SWITCH LEGEND OR FUNCTION | INPUT* AT Q | OUTPUTS | | | | | | | | |
|---|---|---|---|---|---|---|---|---|---|---|
| | | F1 | F2 | F3 | F4 | F5 | F6 | F7 | F8 | ASCII | MEANING |
| 0 | 0 | 0 | 0 | 0 | 0 | 1 | 1 | 0 | 1 | 0 | Numeral 0 |
| 1 | 1 | 1 | 0 | 0 | 0 | 1 | 1 | 0 | 1 | 1 | Numeral 1 |
| 2 | 2 | 0 | 1 | 0 | 0 | 1 | 1 | 0 | 1 | 2 | Numeral 2 |
| 3 | 3 | 1 | 1 | 0 | 0 | 1 | 1 | 0 | 1 | 3 | Numeral 3 |
| 4 | 4 | 0 | 0 | 1 | 0 | 1 | 1 | 0 | 1 | 4 | Numeral 4 |
| 5 | 5 | 1 | 0 | 1 | 0 | 1 | 1 | 0 | 1 | 5 | Numeral 5 |
| 6 | 6 | 0 | 1 | 1 | 0 | 1 | 1 | 0 | 1 | 6 | Numeral 6 |
| 7 | 7 | 1 | 1 | 1 | 0 | 1 | 1 | 0 | 1 | 7 | Numeral 7 |
| 8 | 8 | 0 | 0 | 0 | 1 | 1 | 1 | 0 | 1 | 8 | Numeral 8 |
| 9 | 9 | 1 | 0 | 0 | 1 | 1 | 1 | 0 | 1 | 9 | Numeral 9 |
| Clear | 10 | 1 | 1 | 1 | 1 | 1 | 1 | 1 | 1 | Del | Clear Entry |
| Repeat | 11 | 1 | 0 | 0 | 0 | 1 | 0 | 0 | 1 | DC1 | Repeat Previous Number Played |
| Send | 12 | 0 | 1 | 0 | 0 | 1 | 0 | 0 | 1 | DC2 | Send Data to Central Processor |
| Verify Lock Switch | 13 | 1 | 1 | 0 | 0 | 1 | 0 | 0 | 1 | DC3 | Go to Verify Program |
| Coin | 14 | 0 | 0 | 1 | 0 | 1 | 0 | 0 | 1 | DC4 | Increment Coin Register |
| Verify Coin | 15 | 1 | 1 | 1 | 0 | 0 | 0 | 0 | 1 | BEL | Increment Verify Coin Register |
| — | None | 0 | 0 | 0 | 0 | 0 | 0 | 0 | 0 | — | No Signal |

*All other inputs at +5V - Logic 1

The logic array then puts out this code which goes to the input of the registers 324 and 326 which then holds the code at their inputs. The code comes out of the logic array as an eight bit code with the eighth bit for timing. The timing code is sent to the delay 328 which provides a short delay 330 before allowing the clocking of the input. This gives the logic array a short time for settling, making sure it has completed its final routine and the data is valid before being clocked. When clocked, the information now contained in the registers, is sent to the console processing unit 108 via the parallel I/O interface 112.

At this time, a signal is sent by the register 326 to the console processing unit 108 that the data is being sent 332 and when received by the unit 108 a signal is sent 334 by the unit 108 to clear the registers 324, 326 for new data. The registers may be cleared also by an enabling switch 336 if the player wishes to clear the number of function entered.

In regard now to FIG. 8, a schematic of the game selection and lamp display 114 is shown. This, as in the case of the data entry means of FIG. 7, is used merely as an example and is by no means exclusive. Any alternate means may be incorporated into the system to provide a similar function.

The player console 100 may be equipped with a number of different games as aforementioned, and as such it is important to ensure that the proper game signal (see chart 2) is sent and that only one game is going at a time. When a game select button 338A-N is depresssed, the appropriate flip-flop 340A-N is set, providing a low level impulse, logic zero, at the enabling gate associated with the block of ROM 116–124 programmed for the service routine for the particular game chosen. When any game selection flip-flop is set, all others are clocked to a reset state 342 disabling the block of ROM associated with them.

In addition, if a game selected is depressed and a player wishes to change his selection, the enabling of the second game selection switch will disable the first game selection switch, clearing it via signals at 344.

Enable N represents the number of games selection desired to be incorporated in the system, with each tied in a fashion similar to that shown and discussed with regard to game 1 and game 2.

FIG. 7 ties in with FIG. 8 via the data bus 346 which comprises bits D0 through D7, which is an example of lamp control address wherein the console processing unit 108 controls the state of various illumination of the indicator lamps 354 of the player console 100 by depositing a logic 0 at the appropriate bit and data word. In this regard, chart 4 herebelow provides an example of the game select and lamp display control word:

CHART 4

| BIT IN DATA WORD | SIGNIFICANCE OF 0 |
| --- | --- |
| D 0 - Game Over | Reset Game Select Latches |
| D 1 - Win | Illuminate Panel Lamp Indicating a Win |
| D 2 - Deposit Coin | Illuminate Panel Lamp Requesting a Coin |
| D 3 - Select Game | Illuminate Panel Lamp Requesting Game Selection |
| D 4 - Enter Number | Illuminate Panel Requesting a Number |
| D 5 - Send | Illuminate Panel Lamp Requesting Send Button be Depressed |
| D 6 - Play | Illuminate Panel Lamp Requesting Player to Play |
| D 7 - Wait | Illuminate Panel Lamp Instructing Player to Wait |

This is held in the register 348, which, when enabled by the address bus 350, receives the data from the data bus 346 and provides the logic signals, via switching transistors to turn on the appropriate lamp(s) 354. This address bus is the binary version of the machine code, thus providing a hardware verification, so that the proper lamp(s) will not be illuminated if the wrong machine code is received from the central processor 144 thereby indicating that the game is not to be played.

This code is placed on the address bus 350 by the console processing unit 108, and is decoded by the gates, U4, U5, U6, U8 and U9, the code to be decoded is determined by the Jumpers 356 which may be wired in such a manner that either a logic 0 or 1 is required at each address bit to enable the display logic.

The address bus 350 provides a code with the jumper program address 356 wired in special way that the communication between the central processor 144 and/or the multiplexer 142 and the player console 100 is coded peculiar to each player console. As it is a sixteen bit array, it allows the tying in of 65,356 player consoles. If the system exceeds that, then player console code can be expanded to 24 bits if necessary.

In operation for example, if a win code was sent from the central processor 144 it would be received only at the player console 100 in which the proper player code was wired. This would enable register 348 to provide an output amplifying the "you won" signal 354. In this regard, the address bus 350 will pick up the signal addressed to particular player console 100, and provide a signal through gates 358 and 360 to a gate 362, which when coupled with logic 0 from bit 364 will signal that the game is over and will reset the game latches via the connection 366. Of course other means of identifying the individual player consoles suitable for purpose may be utilized if so desired.

Turning now to FIG. 9, a perspective view of a player console 100 is shown. Parts corresponding to previous figures will be similarly numbered. To initiate play, the player would deposit a desired amount of currency, which would be determinative of the dollar amount game pool the play would be placed in. This could be by placing coins in slot 328 or paper currrency in the dollar receiver 370 which would connect to the currency reader 106.

The keyboard 102 is incorporated in the player console to allow the player to enter his identification number, or as in the case of a paramutual game, the number the player has selected for the particular play. As the player enters his number, each digit entered may appear on the video monitor 128 of the player console or alternatively in a smaller display 372. By a visual readout of the numbers entered, if the player mistakenly enters a wrong number, a clear switch 336 is provided to clear the numbers entered allowing the player to enter the proper number.

In addition, identification may be facilitated by the use of an encoded card as aforementioned, bearing the players identification, placed into the card reader 106 through a slot 374. This card reader may also be used to provide credit for play if for example an account existed from which the player could draw funds. Therefore by placing a credit type card into the card reader, not only may the players identification be established but also funds necessary for play.

A number of switches 338A-N are provided designating various games that the player may select from. As aforementioned, the games would include both paramutual and instant win games. A player pool is provided for each game and this pool is then broken down into smaller pools as per the amount played. Only one game may be played at a time and when played, would signal a particular game program 116–124 to control the display on the monitor 128.

All of the information contained in the player console 100 may now be sent to the central processor 144 by pressing the send switch 376.

If an instant game is played, the time of receipt of the information by the central processor 144 will, if desired, determine if its a winner, and if so, the player console 100 will instantly print, via printer 110, a winner's check exiting through a slot 378 provided which has the advantages aforenoted. Alternatively, if the play is a loss, a losers receipt might be printed. Similarly, if a paramutual game is played then the printer would be instructed to print a receipt which may also exit through slot 378.

The players console 100 is also provided with a repeat switch 380 which would allow the player to repeat a previous play without the necessity of again having to punch if the necessary data, but would require the input of currency to be enabled.

In addition, a verification switch 382 would also be provided to enable the player console to verify winning checks or paramutual winnings if so desired. As previously mentioned, the verification of a winning check could provide a tissue print out to the previously printed check. The printing of the winning check, check verification and paramutual receipt may be done by a single or independent printers 110 as aforementioned.

The video display 128 would provide the player with instructions as to play, total amount played and possibly daily special etc., in addition to those previously mentioned and such information may appear as a burst or gradually typewritten.

To maximize security of the player console 100, it would be sensitive to physical penetration. If penetrated, it would disconnect the communication lines, and turn itself off thereby signaling the central processor 144 of the situation. Also, the player console 100 could be equipped with a means for periodic testing to ensure its accuracy.

Turning now to FIG. 10, a possible version of a winning check 382 is shown. The check size is similar to that used daily in business. Contained on it would be the amount of the check 384, player identification number 386, date 388, time of play 390, machine code 392, coded number of the check 394 and possibly the issuing license number 396. In addition, the check may be printed on specially water marked paper providing an additional means to check its authenticity.

In regard to possible expansion, the activity on a system may be so extensive that the number of player consoles per multiplexing processor may have to be reduced. This, in a large system, will necessitate additional multiplexing and/or multiple central processors.

Additional multiplexing can be accomplished with additional mini-computers, i.e., PDP-11/35 or equivalents equipped with appropriate multiplexing program in ROM, core or other types memory for temporary data storage, and high speed serial data interfaces and modems as aforementioned.

If the system proves to be too busy and/or too large for a single central processor to maintain the system without excessive delays, a multiple central processor scheme may be implemented. Such a scheme would possibly involve separate processors for groups of games, with each central processor connected with every multiplexing processor, with the multiplexing processors programmed to route the proper game to the appropriate central processor. Or separate processors, each would have its own compliment of multiplexers and player consoles, however, these processors should have shared memory, for statistical, and game data, but otherwise, operate independently.

Although a preferred embodiment has been disclosed and described in detail herein, it should be understood that this invention is in no sense limited thereby and its scope is to be determined by that of the appended claims.

What is claimed is:

1. A wagering system comprising:
   playing means for playing at least one type of game including means of making a particular play for a particular player;
   means capable of determining if the particular play is a winning play for the game being played and the amount of the winning play; and
   said playing means includes means capable of providing a record of winning play in the form of a check designating the amount of the winning play.

2. The system in accordance with claim 1 wherein said playing means includes a means of identifying a particular player and said printing means provides the check drawn to the particular player of the winning play.

3. The system in accordance with claim 2 wherein said means of determining if a particular play is a winning play based upon a pre-established standard for winning plays.

4. The system in accordance with claim 3 which includes a central processor and a plurality of player means coupled thereto; said means of determining a winning play is based upon the numerical order of data received by the central processor from the playing means which provides the pre-established standard.

5. The system in accordance with claim 4 which includes means for verifying a winning play.

6. The system in accordance with claim 2 which includes means for verifying a winning play.

7. The system in accordance with claim 3 which includes means for verifying a winning play.

8. The system in accordance with claim 1 which includes means for verifying a winning play.

* * * * *